Oct. 12, 1926.  
G. T. HILTON  
1,603,008  
BRAKING MECHANISM FOR ROAD VEHICLES  
Filed August 20, 1923
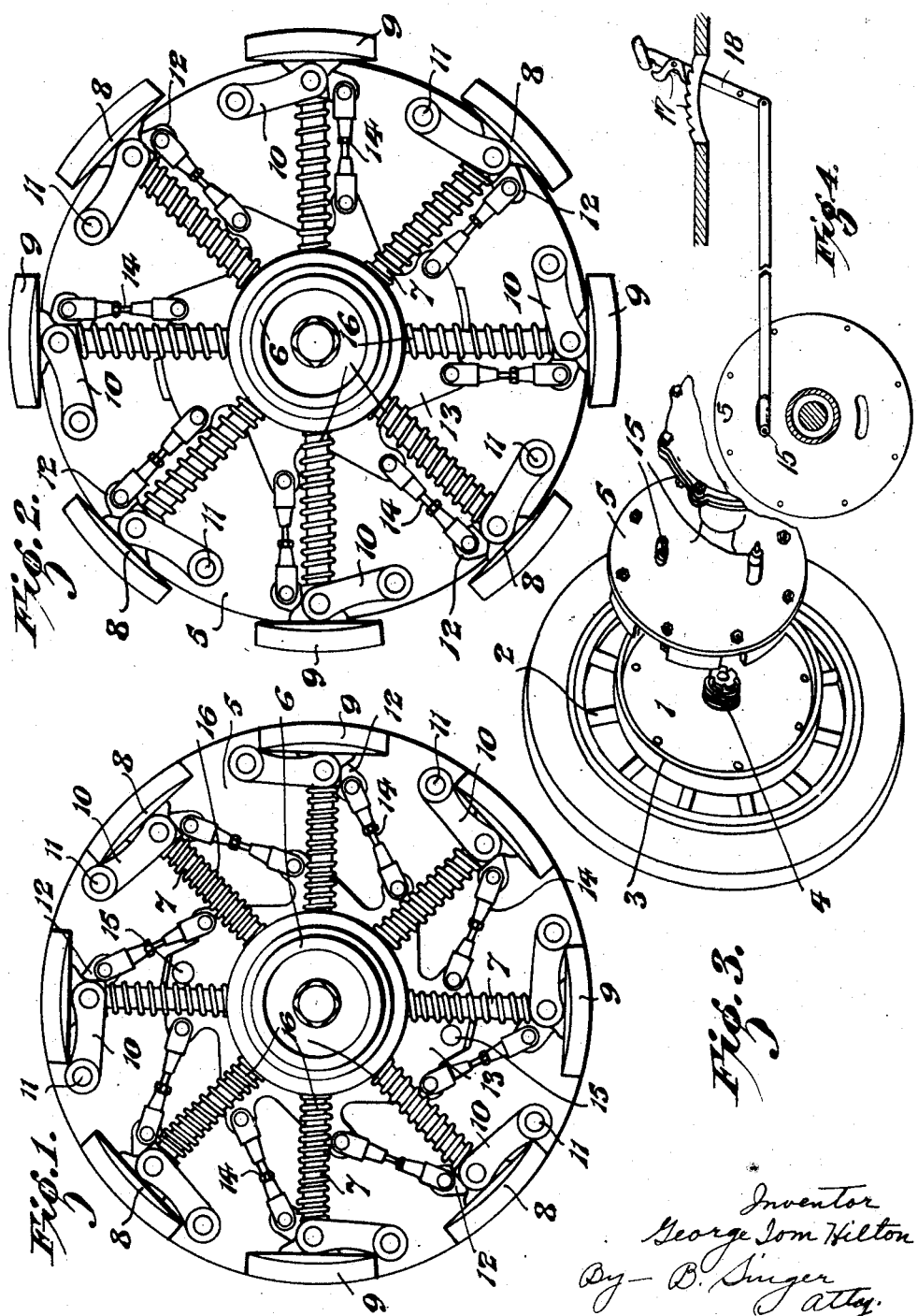
Inventor  
George Tom Hilton  
By— D. Singer  
Atty.

Patented Oct. 12, 1926.

1,603,008

UNITED STATES PATENT OFFICE.

GEORGE TOM HILTON, OF RUGBY, ENGLAND.

BRAKING MECHANISM FOR ROAD VEHICLES.

Application filed August 20, 1923, Serial No. 658,402, and in Great Britain November 30, 1922.

The present invention has relation to braking mechanism for road vehicles, particularly motor cars, and has for its object to increase the efficiency of such mechanism whereby it is adapted to operate more smoothly and positively than heretofore. A feature of the present invention accrues from the fact that should the operating mechanism of the brake become inoperative or out of action the brake automatically applies itself.

The present invention comprehends a brake having in combination an annular braking surface, a series of brake blocks carried on radially disposed slidable or displaceable spokes or stems, compressed or strained spring media tending to force the blocks into engagement with the braking surface, and means acting against the spring media for normally preventing braking engagement, adapted to be actuated by the driver of the vehicle or other person to permit of the braking operation by the action of the spring media.

Conveniently the brake blocks are adapted to be applied through the medium of normally compressed or strained helical springs surrounding the spokes or stems, which springs are releasable, or variable by the operator through suitable mechanism, and should such mechanism fail the springs automatically throw the brake into action.

The present invention further comprehends a brake having in combination an annular braking surface, a series of brake blocks carried on radially disposed slidable or displaceable spokes or stems and hand or foot control means for radially displacing the brake blocks against the action of spring media so that said band or foot control means operates to pull the blocks into an inoperative or free position.

The brake blocks may be controlled by an annular plate or element rotatable upon the hub or brake centre, and having a series of oblique links connecting with the said brake blocks, so that upon rotation of the plate or element, the links are displaced through an angle to permit of the radially outward movement of the brake blocks.

In order that this invention may be clearly understood and readily carried into practice, reference may be had to the appended explanatory sheet of drawings, upon which:—

Figure 1 is an elevation of a brake constructed according to the present invention, and shown in a contracted or inoperative condition.

Figure 2 is an elevation of the brake mechanism shown in Figure 1, illustrating the position of maximum brake pressure.

Figure 3 illustrates in perspective the aggregation of the present brake mechanism upon the axle of a motor vehicle.

Figure 4 is a diagram showing a lever and a pawl and ratchet mechanism arranged for use to hold the brake mechanism in inoperative position.

In a convenient embodiment of the present invention the rotating brake drum involves a circular disc 1 (Fig. 3) suitably attached to the wheel 2, and an annular laterally projecting flange 3 disposed at the periphery of the disc. This drum 1—3 has a central hollow boss 4 through which the wheel axle is adapted to pass and is adapted to be closed by a fixed disc 5 in the centre of which is a tubular boss 6 (Figs. 1 and 2) which encircles the boss 4 on the moving part and is separated therefrom by ball bearings. In this boss 6 a series of radially directed brake elements are adapted to slide. Each brake element involves a spoke or stem 7 having a head 8 and a brake block 9 attached to said head. The inner extremity of the spoke is adapted to slidingly engage the tubular boss 6, and the outer extremity has pivoted thereto a link 10 which is itself pivoted at the point 11 to the fixed disc 5. This link 10 in each instance is extended at 12 and is connected to a rotatable plate or element 13 by a connection link 14. A helical spring 16 is incorporated around the spoke or stem bearing upon the underside of the head and the tubular boss 6 tending to force the brake block radially outwardly. Eight or other suitable number of these radially disposed brake elements are utilized and the brake blocks are adapted to bear against the inner face of the flange 3 on the wheel 2.

The rotation plate or element may be actuated in any suitable manner, as for instance through the medium of a projection 15 operating in a slot in the fixed part 5.

Normally the plate or element 13 is set so that the springs 16 are in compression or are strained. The application of the brake is therefore very easily effected. Should any of the operating mechanism of the brake fracture, the brake will automatically apply itself.

By employing a series of braking blocks around the entire braking surface a very even and smooth braking is obtained.

The number 15 attached to the plate or element 13 may be actuated from any suitable foot or hand controlled mechanism. A suitable ratchet or other holding mechanism 17 is combined with a lever here shown in Fig. 4 as a pedal lever 18, for the purpose of holding the brake in the inoperative position.

What I claim as my invention and desire to secure by Letters Patent is:—

1. Internal expanding brake mechanism for a road vehicle wheel having a brake drum, said mechanism comprising a series of brake blocks arranged for radial movement, springs normally under tension and tending to force the blocks outwardly into braking position and means operable to withdraw and normally hold the blocks out of engagement with the drum.

2. Internal braking mechanism for drums of automobiles comprising a pair of elements one fixed and the other arranged co-axially therewith and for partial rotation with respect thereto, the first named element having spokes and coil extension springs on said spokes, links pivotally mounted on the first named element, brake blocks pivotally connected to the free ends of said links and movable by said springs, and links connecting the first named links to the second named element and active when the second named element is turned in one direction to radially withdraw said brake blocks and the first named links.

In witness whereof I have hereunto set my hand.

GEORGE TOM HILTON.